May 1, 1956 — M. R. OLSEN ET AL — 2,744,188
PORTABLE HAND LANTERN
Filed April 1, 1954 — 2 Sheets-Sheet 1
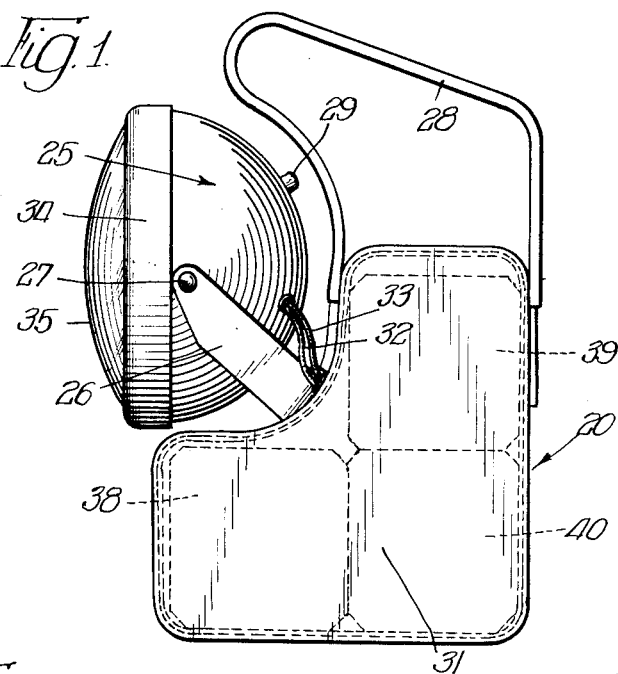
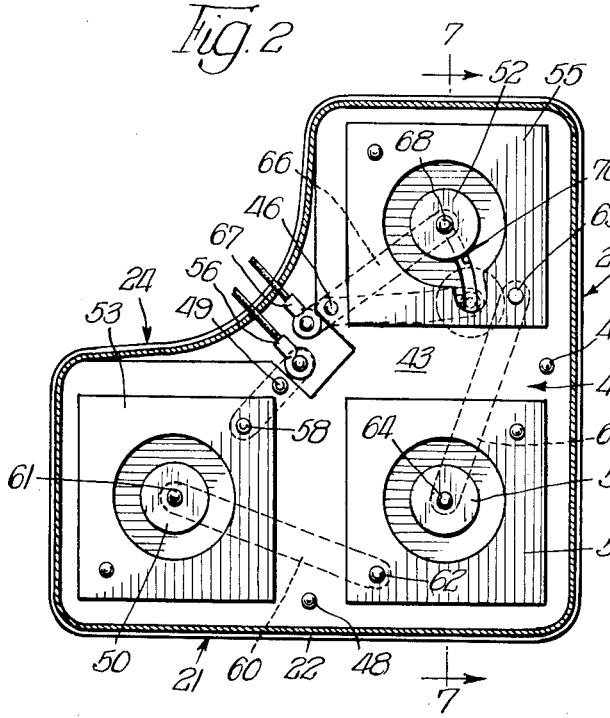
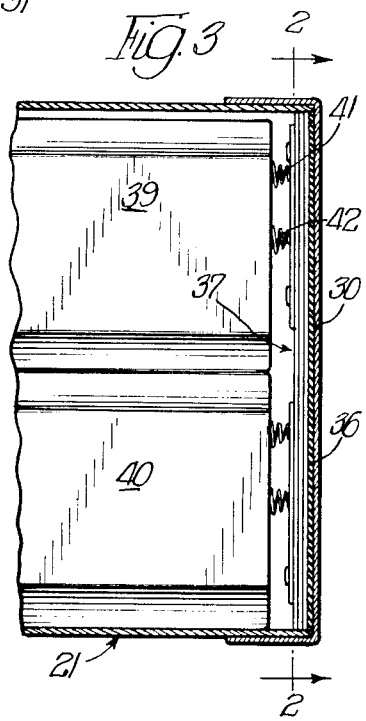
INVENTORS.
Marvin R. Olsen,
Bill Rosinski,
BY Nicholas W. Keller, May 1, 1956  M. R. OLSEN ET AL  2,744,188
PORTABLE HAND LANTERN
Filed April 1, 1954
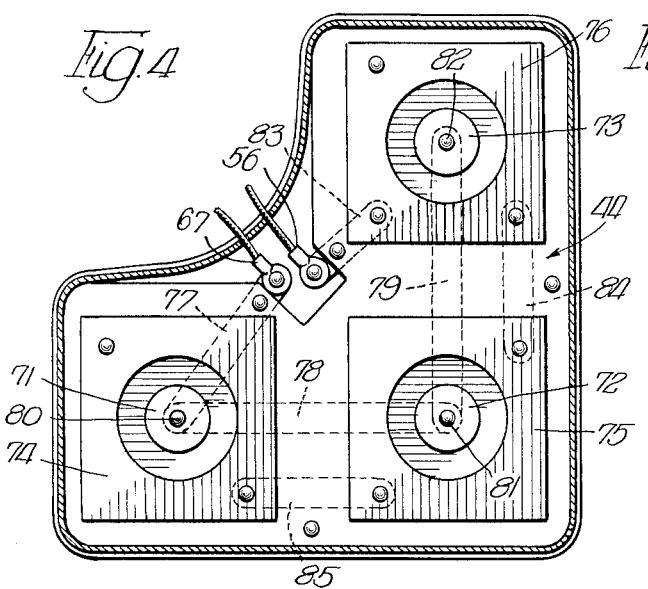
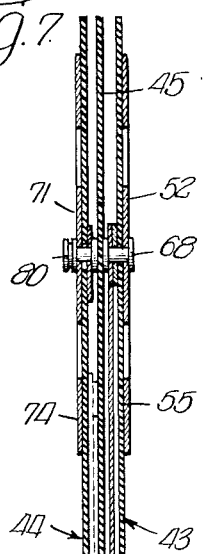
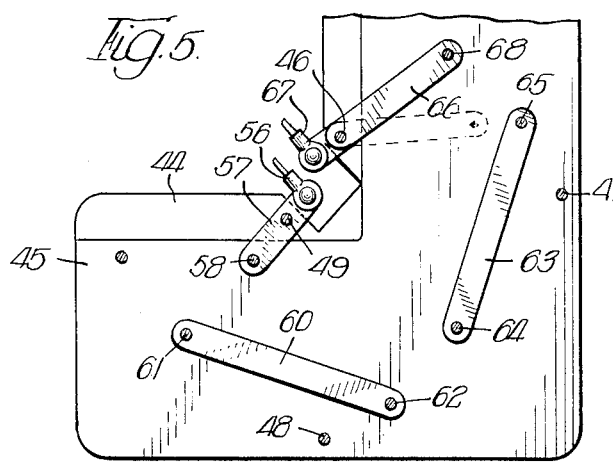
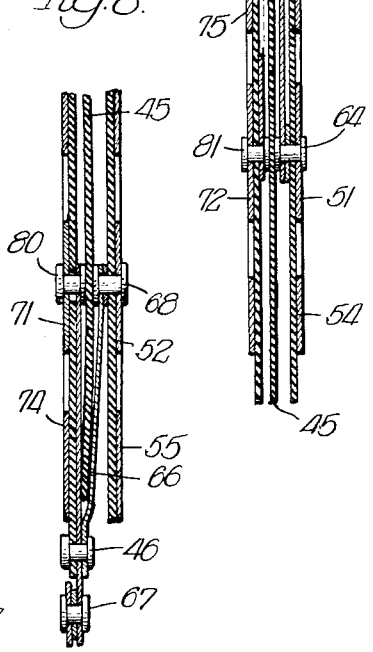
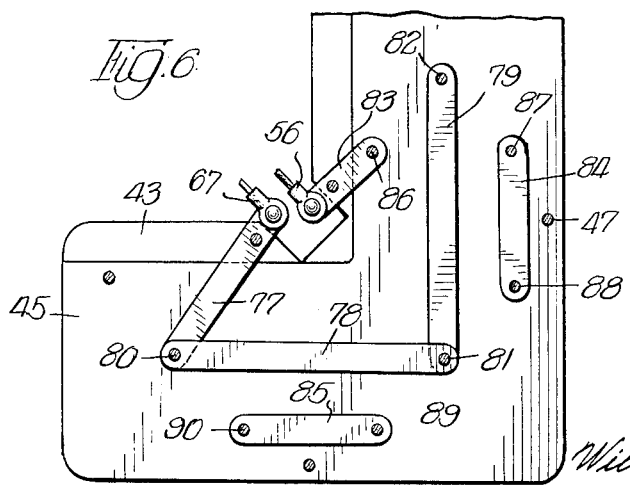
INVENTORS.
Marvin R. Olsen,
BY Bill Rosinski,
Nicholas W. Keller

United States Patent Office 2,744,188
Patented May 1, 1956

2,744,188

PORTABLE HAND LANTERN

Marvin R. Olsen, Glen Ellyn, and Bill Rosinski and Nicholas W. Keller, Chicago, Ill., assignors to Justrite Manufacturing Company, Chicago, Ill., a corporation of Illinois Application April 1, 1954, Serial No. 420,332

6 Claims. (Cl. 240—10.63)

The invention relates to lanterns and has reference in particular to a portable lantern capable of producing light beams of different intensities by means of a reversible contact unit and which may be rendered operative for electrically connecting two or more of the lantern batteries either in a series or a parallel circuit relation.

The casing of the present lantern has a main body portion of special shape and to which is fixedly secured a handle and a headlight section, the headlight section referably embodying the improvements such as disclosed and claimed in Reissue Patent No. 23,193. The section is pivotally mounted for movement about a horizontal axis and incorporates an electric switch for controlling the electric circuit connecting the batteries with the light bulb. One side member of the present flashlight lantern is fixed to the casing, whereas the other side member is removable to constitute a lid for the casing, and which permits access to the batteries and also access to the removable contact unit which is reversible to change the electrical connections for the batteries from a series to a parallel circuit or vice versa.

Accordingly, an object of the invention is to provide an improved portable lantern capable of containing three lantern batteries for producing a high intensity light beam when electrically connected in series and for producing a lower intensity light beam when the batteries are electrically connected in parallel. The invention also contemplates the provision of switch means for short circuiting at least one of the batteries when in series circuit relation to select an intermediate intensity for the light beam, and the battery thus short circuited may be removed from the casing or may remain as a spare, in which latter case it is readily available at all times.

Another object of the invention is to provide a lantern of the portable type capable of containing three lantern batteries and which will also incorporate a reversible contact unit whereby with one side of the unit operative the batteries will be connected in series circuit, and when the unit is reversed to render the other side operative the batteries will be connected in parallel circuit.

Another object is to provide a reversible contact unit for a lantern battery as above described which will essentially consist of three flat plates of insulating material riveted together in overlying relation, wherein contact elements are affixed to the two outer plates constituting the top and bottom of the unit, wherein the third or middle plate functions to electrically insulate the said plates from each other, and wherein the contact elements of said plates are especially designed to accommodate a six volt lantern battery of the conventional type.

With these and various other objects in view, the invention may consist of certain novel features of construction and operation, as will be more fully described and particularly pointed out in the specification, drawings and claims appended hereto.

In the drawings, which illustrate an embodiment of the device, and wherein like reference characters are used to designate like parts—

Figure 1 is a side elevational view of the portable flashlight lantern selected for illustrating the present invention;

Figure 2 is a transverse sectional view taken substantially along line 2—2 of Figure 3 and showing the series plate of the contact unit of the invention, the same incorporating a switch for short circuiting one of the lantern batteries;

Figure 3 is a fragmentary sectional view taken longitudinally of the casing and showing the batteries in electrical association with the contact unit;

Figure 4 is a transverse sectional view similar to Figure 2 but showing the contact unit with its parallel plate in operative position for electrically connecting the lantern batteries;

Figure 5 is a plan view showing circuit conductors and their arrangement for the series contact plate;

Figure 6 is a plan view showing other circuit conductors and their arrangement for the parallel contact plate;

Figure 7 is a sectional view taken through the contact unit substantially along line 7—7 of Figure 2 and illustrating the construction of the contact plates and the superposed arrangement thereof with the middle insulating plate; and Figure 8 is a fragmentary sectional view taken vertically through the contact unit and illustrating the switch associated with the series contact plate.

Referring to the drawings, the flashlight lantern selected for illustrating the present invention essentially consists of a casing or housing 20 of special shape for receiving three lantern batteries of the conventional six volt type. The body portion 21 of the casing includes a bottom 22, a vertical end wall portion 23, and the front curved portion 24. Either wall 22 or 23 could function as the bottom for the lantern since in both cases the curved portion will be conveniently disposed for receiving and supporting the headlight section 25 of the lantern. The arcuate bracket 26 is suitably fixed to curved portion 24 extending horizontally of the same and by means of the trunnions 27 the headlight section 25 is journalled for rotation about a horizontal axis for projecting the light beams vertically as desired by the operator. The handle 28 may take the shape as shown in Figure 1, although other shapes may be designed therefor. One terminal end of the handle is fixedly secured to the vertical wall 23 and the other terminal end of said handle is secured to the curved portion 24. The side walls of the casing are formed by cap members which have telescoping relation with their respective end of the body portion 21. The cap member 30, as shown in Figure 3, provides one side wall of the casing and said member is preferably soldered or welded in fixed relation to the body portion. However, the other cap member, namely 31, forming the other side wall of the casing, is releasable from the body portion for the purpose of inserting and removing the lantern batteries and through this end of the casing it is also possible for the operator to have access to the reversible contact unit which electrically connects the batteries either in series or in parallel circuit relation.

For a complete explanation of the headlight section 25 reference is made to the Reissue Patent No. 23,193 granted January 31, 1950, to Packer and Olsen and entitled Headlight Lantern. Improved switch structure is provided, having an actuating lever such as 29 for controlling the electric circuit from the lantern batteries within the casing to the electric light bulb retained within the section. Said electric circuit includes the wires 32 and 33, as shown in Figure 1, which lead from the headlight section into the casing for electrical connection with the reversible contact unit. The headlight section constitutes the light producing unit of the lantern and contains a socket for receiving a light bulb and a reflector in proper association with the light bulb. Said elements are not disclosed since they form no part of the present invention. A lens ring 34 is detachably secured to the headlight section and said lens ring retains in place the lens 35.

Referring to Figure 3, it will be observed that the inside surface of the side wall 30 is insulated by means of the insulating member 36. An insulating member of similar shape and thickness is disposed in contact with the inside surface of side wall 31, said members functioning to insulate the lantern batteries from the casing to prevent a short circuiting of any battery, should the terminals of the same have contact with the metal of the casing. In accordance with the invention the contact unit identified in its entirety by numeral 37 is placed within the casing of the lantern adjacent the fixed side wall 30 and in overlying relation with the insulating member 36. The present lantern has been designed to receive three lantern batteries which may be identified by numerals 38, 39 and 40. Batteries 38 and 40 are placed in contact with the bottom 22 of the casing and battery 39 is supported by battery 40, being superposed thereon to form a symmetrical arrangement of the three batteries and which makes possible the curved portion 24 of the casing. The exterior space thus provided by the casing in the vicinity of the curved portion 24 is occupied by the headlight section whereby an improved lantern is provided of compact, unitary construction, which, however, presents a pleasing and unique appearance, and which will additionally produce adequate illumination by reason of the powerful light beams which are made possible by the three batteries of the device.

The said lantern batteries, namely, 38, 39 and 40, are inserted in the casing of the lantern with their positive and negative terminals 41 and 42, respectively, being directly inwardly toward the contact plate 37. When the batteries are properly seated as shown in Figure 3, the terminals will have electrical contact with the metal elements provided by the contact unit of the invention, as best shown in Figures 2, 4 and 7, which will now be described. The said unit essentially consists of three plates of insulating material, one being identified by numeral 43 and comprising the series contact plate, the second plate being identified by numeral 44 and comprising the parallel contact plate, with the third plate 45 being disposed therebetween and serving to insulate the two outer plates from each other. Accordingly, it will be observed that the three insulating plates have overlying relation with each other and thus said plates comprise a nested unit since they are fixedly secured together by means of the rivets 46, 47, 48 and 49. Each contact plate has fixed to its outer exposed surface a plurality of center discs and a plurality of rim discs, arranged so as to make electrical contact with the terminals of the batteries. Referring first of all to the series contact plate disclosed in Figure 2, the exposed surface of said plate 43 has fixed thereto the center discs 50, 51 and 52. A rim disc 53 is associated with the disc 50 and in a similar manner rim disc 54 is associated with 51 and rim disc 55 is associated with 52. For connecting the contact elements in series a plurality of metal strips are employed, having location on the underside of the said contact plate 43. Beginning with the negative terminal 56, the same is fixed to metal strip 57, see Figure 5, which is in turn electrically connected to the rim disc 53 by the rivet 58. The center disc 50 is electrically connected to rim disc 54 by the metal strip 60 which is secured to the center disc by rivet 61 and to the rim disc by rivet 62. In a similar manner the metal strip 63 electrically connects center disc 51 with rim disc 55, the strip being united to the respective contact elements by means of the rivets 64 and 65. From the center disc 52 the metal strip 66 electrically connects with the positive terminal 67. However, whereas metal strips 60 and 63 are stationary, it will be understood that metal strip 66 is movable, being pivotally secured by rivet 46 so that the center disc 52, secured to strip 66 by rivet 68, may move from a center position to a rim position for electrical contact with the rim disc 55, whereby to short circuit the lantern battery 39 in association therewith. To permit such movement of the disc 52 the contact plate 43 is formed with an arcuate groove such as 70, said groove accommodating the rivet 68 and permitting movement of the parts with respect to 46 as a center.

With the series contact plate 43 in an operative position for contact with the terminals of the lantern batteries, it will be seen that the positive and negative terminals of battery 38 have contact with the center disc 50 and with rim 53, respectively. In a similar manner the terminals of battery 40 contact with discs 51 and 54 and as regards battery 39, its terminals contact with discs 52 and 55. Thus the series circuit for the batteries, beginning with positive terminal 67 and assuming the switch 66 to be open, will include the said metal strip 66 and center disc 52, the battery 39, rim disc 55 and strip 63 to center disc 51, the battery 40, rim disc 54 and strip 60 to center disc 50, the battery 38, rim disc 53 to strip 57 and the negative terminal 56. When it is desired to decrease the intensity of light by having only two batteries in series, the strip 66 can be moved on pivot 46 to locate center disc 52 in electrical contact with rim disc 55. As a result the battery 39 is not included in the series circuit and since the battery is not in use it functions as a spare, being available at all times. The contact plate 43 will therefore connect two of the batteries or all three in series relation and it is a relatively easy matter for the operator to locate the movable center disc 52 in either an open or in a short circuiting position.

In accordance with the invention the contact unit 37 includes a parallel plate in addition to said contact plate. The parallel plate 44, as best shown in Figures 4 and 6, includes the center discs 71, 72 and 73, and the rim discs 74, 75 and 76. The positive and negative terminals 67 and 56 of the contact unit appear to have been reversed but this is due to the fact that the unit has been flopped over to render the parallel contact plate operative. Accordingly, the positive terminal 67 is connected to the center discs 71, 72 and 73 by the metal strips 77, 78 and 79, and which are secured thereto by rivets 80, 81 and 82. The negative terminal 56 is connected to the rim discs 76, 75 and 74 by metal strip 83, 84 and 85 with rivets 86, 87, 88, 89 and 90 being employed to secure the strips to the discs, all as clearly shown in Figure 6. As regards this parallel plate, any one of the batteries may be used, or all three, since the center discs are connected together and with terminal 67, and the rim discs are also electrically connected together and with terminal 56. The batteries are rendered operative by placing their terminals in contact with their respective center and rim discs. To render them inoperative the batteries are reversed in the lantern casing and in this position the batteries function as spares, being available for use at any time.

The flexible wires 32 and 33 allow for removability of the contact unit from the lantern casing while still maintaining electrical connection with the headlight section. Upon removal of the unit the same can be flopped over or reversed to present either contact plate operative. The unit is then replaced in the casing and the batteries are inserted and their association with the contact elements as described makes it possible for the operator to produce light beams of different intensities.

For the series circuit using the conventional six volt lantern battery a total of eighteen volts can be produced or a total of twelve volts with operation of the switch to short circuit battery 39. Light beams of maximum intensity will accordingly result. When the contact unit is flopped over to render the parallel side of the same operative, lower intensity light beams will be produced and which will reduce the drain on the batteries so that their useful life is prolonged. Another advantage of the parallel circuit resides in the fact that a maximum of one and one-half amperes can be drawn from the batteries if each one is capable of delivering half an ampere. Thus, a light bulb can be used with the parallel circuit arrangement which may have a heavier and more rugged filament than the conventional light source. Also the parallel circuit arrangement will have particular utility in connection with the use of the two-filament light bulb with double filament base.

The invention is not to be limited to or by details of construction of the particular embodiment thereof illustrated by the drawings as various other forms of the device will of course be apparent to those skilled in the art without departing from the spirit of the invention or the scope of the claims.

What is claimed is:

1. In a portable lantern, a casing adapted to contain a plurality of lantern batteries, a light producing section carried by the casing exteriorly of the same, said casing having a fixed end wall and a releasable end wall, a contact unit adapted for location within the casing adjacent the fixed end wall but being removable for reversing the exposed side of the unit, said contact unit being adapted to coact with the lantern batteries for completing an electric circuit to the light producing section, said unit including a series contact plate, a parallel contact plate and a member of insulating material located between the two contact plates, each of said contact plates comprising a plate of insulating material having a plurality of positive and negative contact elements fixed thereto on the outer surface of the plate and being properly oriented for engagement respectively with certain terminals of said batteries, metal strips for each contact plate located on the side adjacent the member of insulating material, the metal strips for the series plate electrically connecting the contact elements thereof to form a series circuit, the metal strips for the parallel plate electrically connecting the contact elements thereof to form a parallel circuit, whereby either the series or the parallel contact plate is operative for connecting the batteries in series or in parallel circuit relation depending on which side of the contact unit is disposed for coaction with the batteries, and said releasable end wall when affixed to the casing providing a closure therefor and thereby maintaining the batteries within the said casing.

2. In a portable lantern, a casing adapted to contain a plurality of lantern batteries, a light producing section carried by the casing exteriorly of the same, said casing having a fixed end wall and a releasable end wall, a contact unit adapted for location within the casing adjacent the fixed end wall but being removable for reversing the exposed side of the unit, said contact unit being adapted to coact with the lantern batteries for completing an electric circuit to the light producing section, said unit including a series contact plate, a parallel contact plate and a member of insulating material located between the two contact plates and being substantially coextensive in area, each of said contact plates comprising a plate of insulating material having a plurality of positive and negative contacts fixed thereto on the outer surface of the plate and being properly oriented for engagement respectively with certain terminals of said batteries, the negative contacts each having a center opening therein and the positive contacts each comprising a disc located within an opening in its negative contact in spaced relation thereto, metal strips for each contact plate having location on the side adjacent the member of insulating material, the metal strips for the series plate electrically connecting the contacts thereof to form a series circuit, and the metal strips for the parallel plate electrically connecting the contacts thereof to form a parallel circuit, whereby either the series or the parallel contact plate is operative for connecting the batteries in series or in parallel circuit relation depending on which side of the contact unit is disposed for coaction with the batteries.

3. In a portable lantern casing adapted to contain a plurality of lantern batteries, a light producing section carried by the casing, said casing having a fixed end wall and a releasable end wall, a contact unit adapted for location within the casing adjacent the fixed end wall but being removable for reversing the exposed side of the unit, said contact unit being adapted to coact with the lantern batteries for completing an electric circuit to the light producing section, said unit including a series contact plate, a parallel contact plate, and a member of insulating material located between the two contact plates and being fixedly secured thereto to constitute a unitary assembly, each of said contact plates comprising a plate of insulating material having a plurality of positive and negative contacts fixed thereto on the outer surface of the plate and being properly oriented for engagement respectively with certain terminals of said batteries, the negative contacts each comprising an apertured rim disc and the positive contacts each comprising a center disc located within an aperture of a rim disc in spaced relation thereto, metal conductors for each contact plate having location on the inside surface of the contact plate adjacent the member of insulating material, the conductors for the series plate electrically connecting the contacts thereof to form a series circuit, and the conductors for the parallel plate electrically connecting the contacts thereof to form a parallel circuit, whereby either the series or the parallel contact plate is operative for connecting the batteries in series or in parallel circuit relation depending on which side of the contact unit is disposed for coaction with the batteries.

4. A portable lantern as defined by claim 3, wherein one of the center discs of the series contact plate and the conductor electrically connected thereto are mounted for movement to and from an open and a closed circuit position with respect to the associated rim disc, whereby switch structure is provided for disconnecting one of the lantern batteries from the series circuit when the switch is closed.

5. A contact unit of the character described, comprising in combination, a series contact plate, a parallel contact plate, and a partition plate of insulating material coextensive in area and located between the contact plates, means uniting the plates in overlying relation to form a unitary assembly, each of said contact plates comprising a plate of insulating material having a plurality of positive and negative contacts fixed thereto on the outer surface of the plate and disposed in predetermined spaced relation with each other, the negative contacts each comprising an apertured rim disc and the positive contacts each comprising a center disc located within an aperture of a rim disc in spaced relation thereto, and metal conductors for each contact plate having location on the inside surface of the contact plate adjacent the member of insulating material, the conductors for the series plate electrically connecting the contacts thereof to form a series circuit, and the conductors for the parallel plate electrically connecting the contacts thereof to form a parallel circuit.

6. A contact unit as defined by claim 5, wherein one of the center discs of the series contact plate and the conductor electrically connected thereto are mounted for movement to and from an open and a closed circuit position with respect to the associated rim disc, whereby switch structure is provided for short circuiting the particular contacts when the switch structure is in closed circuit position.

References Cited in the file of this patent

UNITED STATES PATENTS

| | | |
|---|---|---|
| 1,304,925 | Woods | May 27, 1919 |
| 2,074,536 | Brown | Mar. 23, 1937 |
| 2,209,185 | Bower et al. | July 23, 1940 |
| 2,212,054 | Spicer | Aug. 20, 1940 |
| 2,594,069 | Poehlmann | Apr. 22, 1952 |
| 2,597,073 | Cunningham | May 20, 1952 |
| 2,608,639 | Packer et al. | Aug. 26, 1952 |